(12) United States Patent
Flamma et al.

(10) Patent No.: US 7,136,883 B2
(45) Date of Patent: Nov. 14, 2006

(54) SYSTEM FOR MANAGING OBJECT STORAGE AND RETRIEVAL IN PARTITIONED STORAGE MEDIA

(75) Inventors: Bruce M. Flamma, Phoenixville, PA (US); William D. Lusen, Ambler, PA (US); Frank W. Racis, Spring City, PA (US)

(73) Assignee: Siemens Medial Solutions Health Services Corporation, Malvern, PA (US)

( * ) Notice: Subject to any disclaimer, the term of this patent is extended or adjusted under 35 U.S.C. 154(b) by 387 days.

(21) Appl. No.: 10/237,541

(22) Filed: Sep. 9, 2002

(65) Prior Publication Data

US 2003/0065898 A1    Apr. 3, 2003

Related U.S. Application Data

(60) Provisional application No. 60/318,124, filed on Sep. 8, 2001.

(51) Int. Cl.
*G06F 17/30* (2006.01)
(52) U.S. Cl. ...................... 707/204; 711/117
(58) Field of Classification Search ............ 707/8, 707/204–205; 711/117
See application file for complete search history.

(56) References Cited

U.S. PATENT DOCUMENTS

| | | | |
|---|---|---|---|
| 5,280,611 A * | 1/1994 | Mohan et al. ............... 707/8 |
| 5,287,497 A | 2/1994 | Behera ....................... 395/600 |
| 5,404,435 A | 4/1995 | Rosenbaum ................. 395/147 |
| 5,644,766 A * | 7/1997 | Coy et al. ................... 707/204 |
| 5,678,046 A | 10/1997 | Cahill et al. ................ 395/616 |
| 5,917,965 A | 6/1999 | Cahill et al. ................ 382/305 |
| 6,085,262 A * | 7/2000 | Sawada ....................... 710/38 |
| 6,181,837 B1 | 1/2001 | Cahill et al. ................ 382/305 |
| 6,219,669 B1 | 4/2001 | Haff et al. ................... 707/10 |
| 6,330,572 B1 * | 12/2001 | Sitka ........................... 707/205 |
| 6,981,005 B1 * | 12/2005 | Cabrera et al. ............. 707/203 |
| 2002/0111133 A1 | 8/2002 | Wittkotter ..................... 455/1 |

* cited by examiner

*Primary Examiner*—Debbie M. Le
(74) *Attorney, Agent, or Firm*—Alexander J. Burke

(57) ABSTRACT

The invention is directed to a system for managing storage of an object in a storage system having a plurality of different storage media divided into different partitions, which includes a storage processor for determining whether a particular storage partition has reached a predetermined capacity threshold; a data migration processor for identifying within the particular storage partition an object to be moved and for identifying a target destination partition for the particular object in response to the capacity determination, the migration processor identifying the target destination partition based on one or more selected from the group consisting of (a) media type of the particular storage partition, and (b) information identifying related objects in the target destination partition; and a transfer processor for transferring data representing the particular object to the target destination partition.

8 Claims, 7 Drawing Sheets

SYSTEM FOR MANAGING OBJECT STORAGE AND RETRIEVAL IN PARTITIONED STORAGE MEDIA

This is a non-provisional application of provisional application Ser. No. 60/318,124 by B. M. Flamma et al. filed Sep. 8, 2001.

FIELD OF THE INVENTION

The present invention is related to a computerized system for managing object storage and retrieval in partitioned storage media. More particularly, the present invention is related to a computerized system for managing storage of an object using the media type of the particular storage partition, and/or information identifying related objects in a target destination partition.

BACKGROUND

Document-imaging systems are often used as a platform for the management of healthcare related documents and the integration of multimedia content in a client server environment. Document imaging is often used for long-term storage of patient data and hospital. This data is often received electronically from a clinical or financial system or it can be input from a paper format (e.g., scanning). Electronic data (in particular, demographic data) that is stored by the document-imaging system is often sent via electronic transactions from a third-party source. Inbound transactions from any external application are handled by a receiver application. Transactions are usually sent from the application to an interface engine, which then routes the transactions to Imaging. Imaging can receive Imaging Style Transactions, XML, or HL7 transactions. After a transaction has been received, the transaction is parsed and the database for the document-imaging system is updated. Outbound Transactions are similarly handled by a sending application.

Such systems require tools for applications to acquire, store, organize, display and manage multimedia content (including traditional reports, images, voice, video, etc.). They also require an adequate mechanism to share multimedia content with healthcare applications regardless of where the content originated. Moreover, these document-imaging systems typically require a mechanism to store objects and to make them available on demand. Any application, including these document imaging applications, that generates binary output, such as electronic documents or reports, may thus choose to send this output to a storage manager, which is typically a separate software component to the document imaging platform, via standard operating system interfaces accessible by both the storage manager and the document imaging system.

While commercial software is available to store and retrieve such data, these systems have significant drawbacks that greatly reduce the performance of hierarchical storage management systems.

For example, physically storing related documents on the same on-line, direct-access devices is usually not necessary because hardware access to the data is very fast. As a result, related documents may be archived by the storage manager wherever enough free space exists. It is especially important, however, to group related documents on long-term storage media, especially if the long-term storage media is a near-line, or potentially off-line media. Retrieval of related documents can be slow while the appropriate media is being loaded (whether manual or automatic), so it is important to reduce the number of pieces of media required to satisfy typical user retrieval requests. The systems of the prior art, however, do not have the ability to efficiently group related data on the storage media.

Also, hardware or software failures may sometimes block access to data. Access can remain blocked until the problem has been corrected. This is especially true of hardware failures, where devices need to be repaired, replaced, restored, and/or rebuilt before the data they contained is accessible again to users. As a result, hardware and software errors can cause data to be unavailable. Unfortunately, the systems of the prior art do not have the ability to automatically alternate copy access to alleviate this problem.

Moreover, storage managers typically attempt to provide users with a consistent view of stored data. Users are allowed to access documents that are in a stable state (i.e. the structure of the document is correct and it is not undergoing any modifications). When a document is being changed, the storage manager blocks user access to the document by putting the document in a "transitional" state and blocks access to an individual document while it is performing work on that document to prevent users from getting a misleading or incomplete view of the data.

Failures may occur for a variety of reasons while a document is being stored, retrieved, or manipulated. When these failures occur, the document is placed in an "error" state and the caller is informed that their requested transaction has failed. If nothing further happened to the document, it would be left in a transitional or error state, it would be unavailable to users, and support personnel would have to manually correct the problem before the document would be available again to users. This could result in long periods of time where a document is not accessible, and could result in a significant drain on support personnel to restore documents to a stable, accessible state. The systems of the prior art do not have the ability to automatically make document repairs.

Accordingly, a system is needed that overcomes these disadvantages in the systems of the prior art.

SUMMARY OF THE INVENTION

The invention is directed to a system for managing the storage of objects in a storage system having a plurality of different storage media divided into different partitions, which includes a storage processor for determining whether a particular storage partition has reached a predetermined capacity threshold; a data migration processor for identifying within the particular storage partition an object to be moved and for identifying a target destination partition for the particular object in response to the capacity determination, the migration processor identifying the target destination partition based on one or more selected from the group consisting of (a) media type of the particular storage partition, and (b) information identifying related objects in the target destination partition; and a transfer processor for transferring data representing the particular object to the target destination partition.

DETAILED DESCRIPTION

The invention will be understood more fully from the detailed description given below and from the accompanying drawings of the preferred embodiments of the invention; which, however, should not be taken to limit the invention to a specific embodiment but are for explanation and understanding only.

The document-imaging system within which the present invention is to be used stores multimedia content in the form of documents. A document in this context is preferably a single, self-contained, data object that is comprised one or more objects. Each object is typically a single binary file. Objects are typically text reports, scanned images, word processing documents, or any other binary data generated by any application.

The document-imaging system organizes documents by filing them hierarchically into folders using a relational database. A folder in this context is simply a virtual container for a set of documents that "belong" to a specific owner. This is analogous to a typical manila folder in a filing cabinet. Similarly, filing a document into a folder is analogous to inserting a paper document into a manila folder. An "owner" is a set of indexes that uniquely identify a specific person, organization, or entity. For example, a patient is a potential "owner" of documents relating to that patient's health care record.

Figure 1:
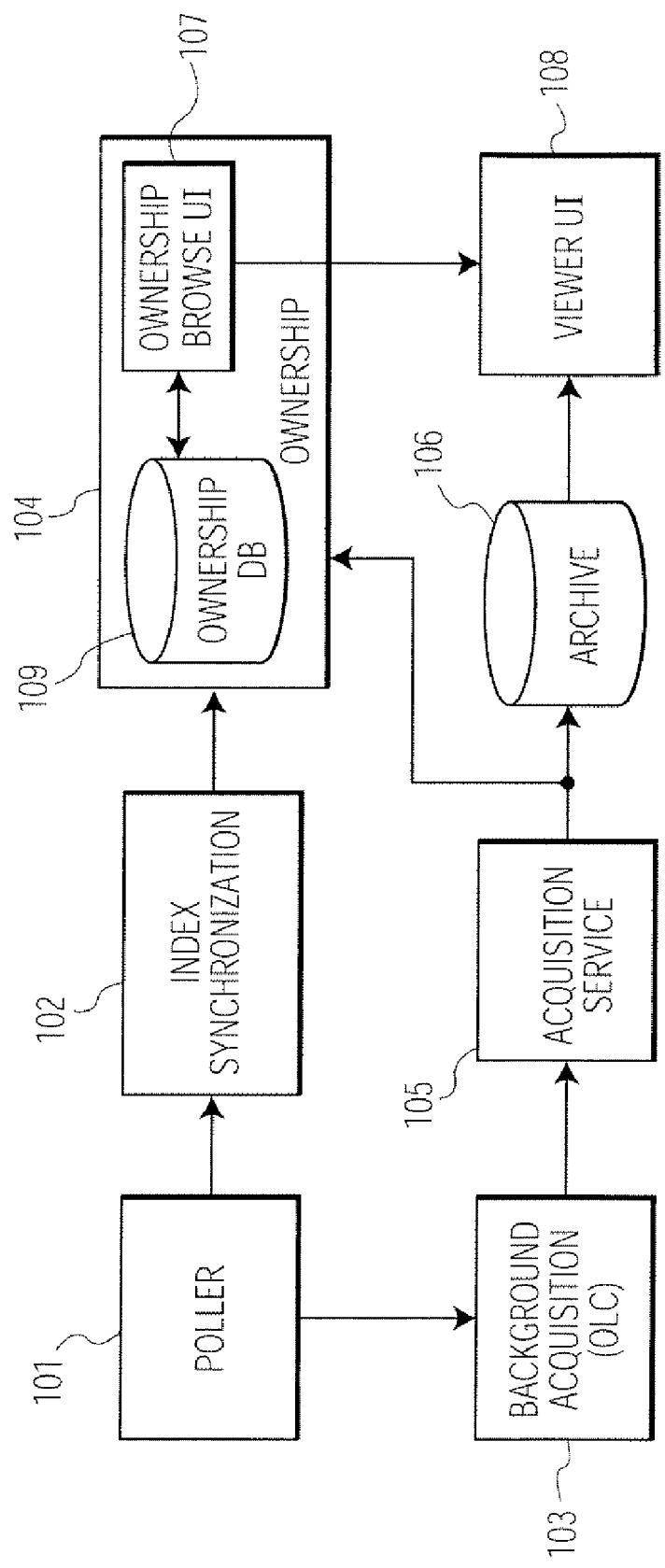
FIG. 1 is a diagram illustrating an overview of a document-imaging system incorporating the storage management system of the invention.

FIG. 1 illustrates a high-level overview of the functionally active components of a document-imaging system incorporating the present invention. The arrows show, in the simplest terms, how the active components relate to each other. Specifically, poller (101) detects new files to be stored or processed by the document-imaging system, and feeds them to index synchronization component (102) and/or to background acquisition component (103) depending on their contents. Index synchronization component (102) takes batched or real-time indexing information, for example, from data repository or database (109) containing a master patient index, interprets the indexing information, and passes it to ownership component (104) to create and/or update folder information.

Background acquisition component (103) processes files to be stored in the document-imaging system by breaking them apart into documents and extracting indexing information for them. These documents and their indexing information are then passed to acquisition service (105). Acquisition service (105) gathers new documents and their indexing information and routes them to storage manager (106) and to ownership component (104) so they are properly stored and associated with the correct folders. Storage manager (106) stores objects, organizes them into documents, and provides hierarchical storage management for the objects.

Ownership component (104) organizes documents by maintaining indexing information in the form of folders and also maintaining the list of documents in each folder within database (109). Ownership also preferably includes browser user interface (107), which is programmed to display, navigate, and maintain the hierarchy of folders and a summary of their contents. Browser user interface (107) is also preferably programmed to enable the display of selected documents by feeding them to the viewer user interface (108). Viewer user interface (108) renders document objects to an output device such as a screen or printer and allows navigation across multiple documents.

This document-imaging system thus preferably utilizes three types of data interfaces that are programmed to communicate with external applications to integrate multimedia content into their workflows and business processes. The interoperable user interfaces provide robust user forms (such as HTML or XML generated user input forms) that external applications may embed within their own user interface as a tightly integrated part of the application workflows. These forms relieve the application of the burden of understanding and formatting the complex multimedia information presented by the document-imaging system. Service level application interfaces use conventional data streams that represent the information stored in the document imaging system and to allow the system to intermix multimedia information with other data in the application. The background data exchange interfaces are programmed to provide communication points between the document-imaging system and an external application to share information therebetween. These interfaces are typically used by the document-imaging system to accept index information or to automatically acquire new documents.

The document imaging system preferably operates on a MICROSOFT WINDOWS 2000™ or WINDOWS NT SERVER™, although not limited thereto, and is described in that implementation herein. In this context, the present invention, as described in more detail below, preferably executes as an asynchronous service that is initiated by independent software (one example being the Poller (101)). This service is accessed preferably as a fully functional Web Service (as understood by anyone of ordinary skill in the art) or as a standard HTTP Post request using an XML as input.

Figure 2:
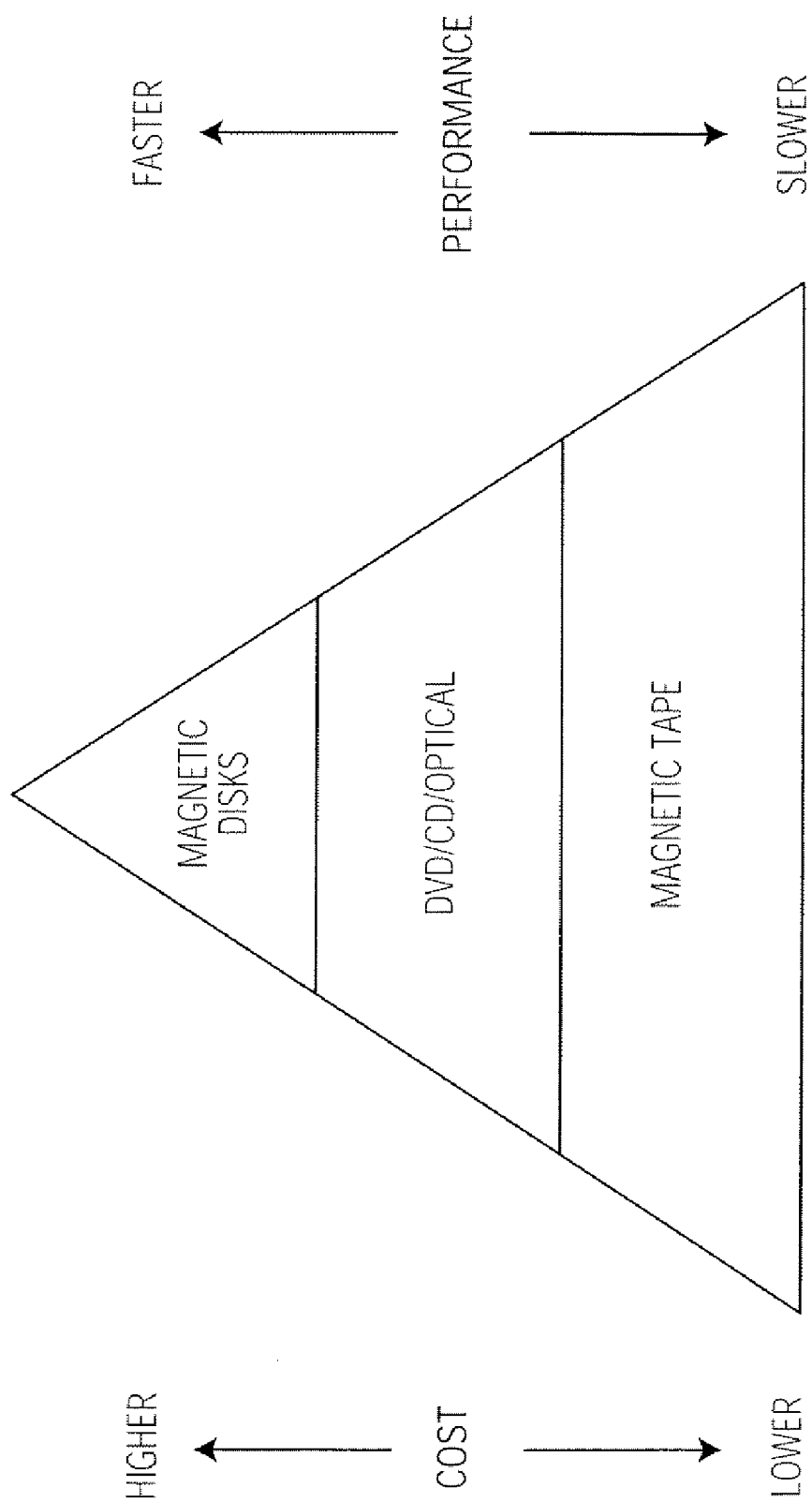
FIG. 2 is a diagram illustrating the concept of storage levels.

The present invention is directed to the hierarchical storage management subsystem of the above-described document-imaging system. It is capable of efficiently storing and retrieving data objects of various sizes and types on demand using different storage levels. FIG. 2 contains a diagram illustrating the typical concept of storage levels. As shown in FIG. 2, the storage capacity of magnetic disks is much less than optical storage media, which is much less than magnetic tape. In contrast, magnetic disks may be accessed more quickly than optical media and magnetic tape. However, the cost of storage increases with the speed with which the media may be accessed. Consequently, the invention preferably supports multiple media types to balance acquisition and retrieval patterns with cost and performance. The storage processor of the invention preferably manages storage space by supporting multiple storage levels.

The storage processor allows multiple storage levels to be of the same media type, with preferably up to 32,767 different storage level definitions. In sharp contrast, the hierarchical storage management software of the prior art has the ability to manage a small number of storage levels. In addition, the storage processor constantly manages storage space allocations, ensuring that sufficient free space is available to store new data. Based on defined thresholds, the storage processor may automatically migrate data among various media types (for example, magnetic disk, optical platter, DVD, CD, and/or magnetic tape) to balance short-term and long-term retrieval needs. The storage processor moves data objects between the storage levels to keep the current and most recently accessed data on the fastest media available.

In other words, the storage processor identifies within a particular storage partition an object to be moved based on frequency of access of the object relative to other objects in the storage partition, the object to be moved comprising an object with a lowest access frequency. The information identifying related objects may comprises, for example, (a) a patient medical record identifier, (b) a patient identifier and/or (c) a patient related information identifier. The storage processor preferably identifies the target destination partition based on one or more selected from the group consisting of (i) physical media device identity, and (ii) a storage attribute identifying a data retention characteristic.

This is described in more detail below in connection with FIG. 5 below.

The storage processor preferably includes programming algorithms that optimally place objects that are most likely to be accessed on the fastest devices. As space on each media fills, objects that are less likely to be accessed are automatically migrated to slower, less-expensive media. The storage processor also employs special programming algorithms to group related objects during the migration process to provide quick access to an object and related information for the life of the object.

Figure 3:
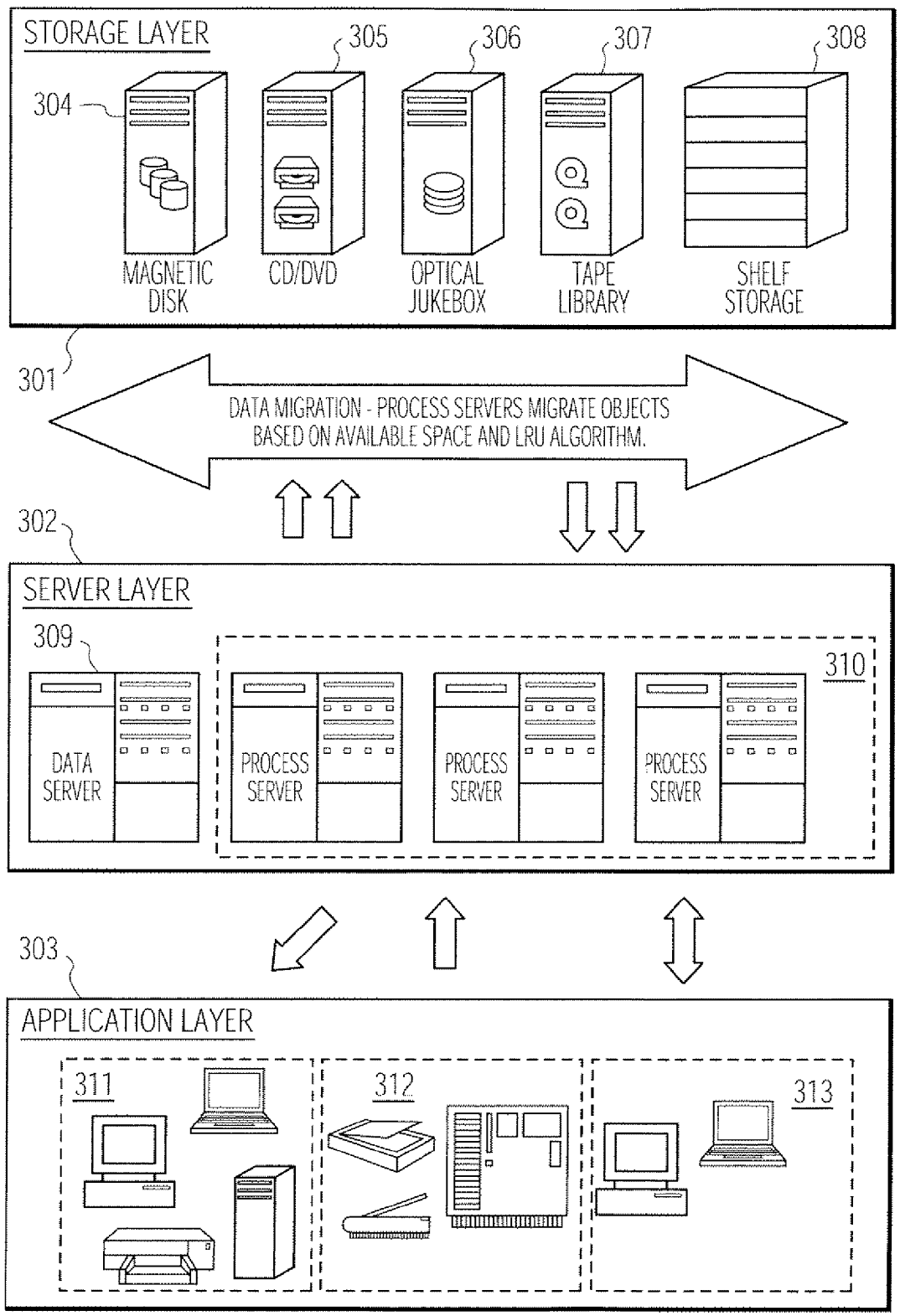
FIG. 3 is a diagram illustrating the architecture of the system of the invention.

FIG. 3 is a diagram illustrating the various layers of the system of the invention as they may be understood by those of ordinary skill in the art. As shown in FIG. 3, the storage processor may be broken down into three layers: storage layer (301), server layer (302), and application layer (303). Storage layer (301) preferably includes the storage devices, such as magnetic disks (304), CD/DVD libraries (305), optical jukeboxes (306), tape libraries (307), shelf storage or semiconductor memory (308), etc.

The server layer (302) incorporates computer servers into the storage processor. These may include one or more database servers (309), which may contain a catalog of where objects are stored and definitions of storage classes, and the like. Server layer (302) may also include a plurality of process servers (310) running individual server processes for the storage processor. These processes manage the storage of object and information associated with the object, the handling of requests from users, or the calling of processes to store and retrieve objects. They also manage the migration of objects between storage levels.

The ability of the storage processor to operate on multiple servers has the significant advantage that it allows easier scalability and provides better availability of the system to the users. It also enables the system to write multiple copies simultaneously to protect against data loss to further improve availability; and to read the primary copy, or the journal copy, of an object if the primary copy is unavailable.

These computer servers control access to storage layer (301). The computer servers write data to storage layer (301), read data from storage layer (301), and migrate data within storage layer (301), as described in more detail below.

On top of this sits software application layer (303). A wide variety of applications are possible in the storage processor. These may include, for example, data manipulations applications (311), input applications (312), and management applications (313). Display and data manipulation applications (311), running on a PC or laptop for example, may access the storage processor to display and print data, access data, process data, generate a report, and distribute the report via e-mail in a conventional manner. Input applications (312) that control input devices, such as scanners, may send data to the storage processor and stored objects for later access. Or, they may process data from a remote system, such as a mainframe, and store the data in the computer servers of the storage processor based on filing rules.

Management utility applications (313) may be included to manage the computer servers of the storage processor. These utilities also provide an interface to manage the removable media devices, such as optical jukebox (307) and tape library (308). These may comprise browser-based utilities, for example, that may be run from a PC or laptop, to manage the computer servers and removable media devices. They may also display statistics and other system information.

Figure 4:
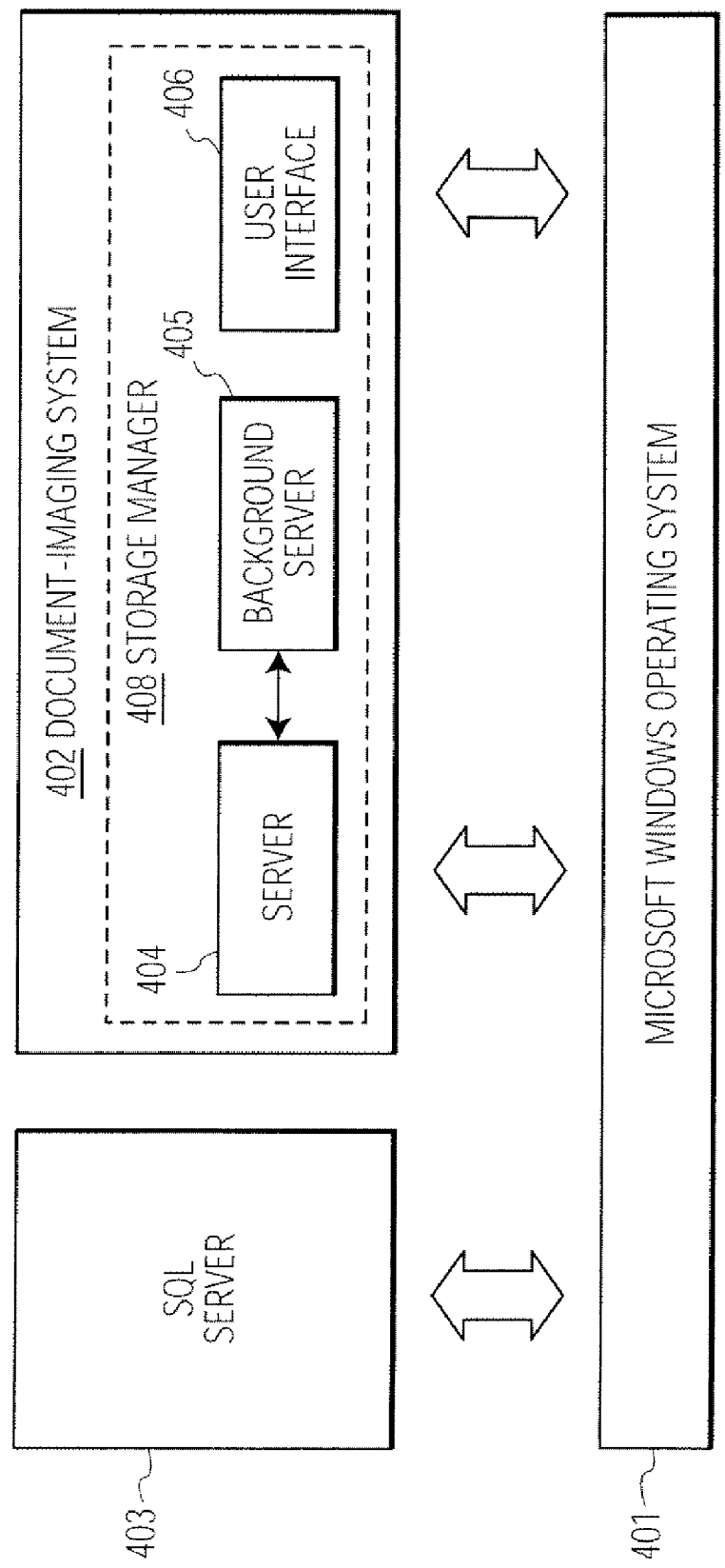
FIG. 4 is a diagram illustrating the high-level components of the invention in relation to the document-imaging system.

FIG. 4 illustrates a preferred embodiment of the software architecture of the storage processor. As shown in FIG. 4, the storage processor preferably operates on a MICROSOFT WINDOWS™ Server platform running MICROSOFT WINDOWS™ operating system (401), which is also running the application layer of document imaging platform software (402), although those of ordinary skill in the art will appreciate that the storage processor is not limited thereto. The database server software is preferably SQL Server 2000 (403), although also not limited thereto. The storage processor is preferably implemented in this context as a set of dynamic link libraries (DLLs) that make up a storage server component (404), a background service component (405), and a browser-based management user interface (406) that communicate using conventional methods, such as COM+ and the like. The user interface (406) preferably uses a MICROSOFT™ XML Parser, although not limited thereto. The client/server software is preferably deployed using a conventional protocols, such as HTTP Post, but is not limited thereto. These components collectively form storage manager (processor) software (408), which is part of document imaging system (402), as noted above.

Storage server (404) controls and manages storage and retrieval activity. Storage server (404) stores data objects, manages media, and provides information (such as object location) to callers. Many server processes may execute simultaneously on a single system or on multiple systems. Each server control process operates within a single document imaging "environment" (defined in this context as a single database/archive with a single, related web-application for a single customer enterprise).

Background storage service (405) preferably executes as a MICROSOFT WINDOWS™ service and may be controlled using the MICROSOFT WINDOWS™ service manager, which is accessible through the MICROSOFT WINDOWS™ "Services" administrative tool. Background storage service (405) accepts instructions from storage servers (404), and performs work either on behalf of a user or work that the storage servers have detected is needed. The main functions of background storage service (405) include migration of documents between storage levels, and data verification to ensure the database and the data files are synchronized.

The storage processor preferably incorporates programming algorithms into the above-described architecture to group related data on the storage media, to automatically alternate access to different copies of a document, and to automatically repair damaged files. The storage processor manages the migration of data from one storage media to another and controls the selection of data and the volume of data that is moved. During the migration of an object, related data may be grouped on the same target media. This grouping of data provides improved performance in subsequent data retrievals.

If storage server (404) detects a media failure, it automatically tries to satisfy the user's request by providing an alternate copy of the same data. The programming of the storage processor preferably includes rules as to the order in which duplicate copies are accessed, which is described in more detail below. This provides increased data availability and reduces, or eliminates, user impact due to hardware failures.

As previously noted, errors may occur while managing the data files associated with a document. When problems occur, the storage processor is programmed to help ensure that a document's definition and associated data are consistent with the user's request. The server preferably ensures that the relationship between the document's definition and the document's data files are synchronized, and that the document is in a consistent and accessible state. Users are prevented from accessing any document that is in the process of being modified or in an error state to avoid inconsistent views and data access problems.

As a result, the storage processor has program algorithms that attempt to automatically repair any document that is in a transitional or error state. This has several important benefits. After an error occurs, users are not prevented from accessing a document because server (404), immediately upon detection, would have corrected most problems. Also, support programmers rarely need to be involved in correcting or verifying the consistency of documents involved in a failed transaction.

During data migration, it is possible for the storage processor to group related documents together on the same physical media to reduce the number of pieces of media that may be needed when a user accesses related documents. When a document is created, a calling application may optionally specify a migration group string. This migration group string, typically a medical record number or patient account number, is preferably a free text string that is determined by the calling application. If the migration group field is valued, storage server (404) may, during migration, write related documents to the same target media that have the same migration group and have not yet been migrated to that partition.

Different types of data have different storage requirements and different retention requirements. In order to satisfy the differing needs of various data types, each level of storage may be partitioned, with each partition servicing different data types. Each partition may be defined to support one media type (such as magnetic, optical, tape, etc.). Partitions are preferably allocated storage space according to the amount of data they are expected to hold. When limited free space remains, migration may be invoked, manually or automatically by the storage processor, to move data to another partition to create free space. For example, partition #1 could be allocated 100 megabytes of magnetic disk space. Migration may also be setup to start migrating data when 10 megabytes of free space is left, and continue migrating until 30 megabytes of free space exists, for example.

Storage classes are preferably used to define the storage attributes of data that have similar retention requirements. Each class has storage levels that define the storage hierarchy of the class. Each storage level is assigned to a particular partition that defines media and space allocations. Each document stored in the storage processor is assigned a storage class. When an object is first stored, its class determines the partition in which the document will be stored. As it ages, a document moves sequentially through the storage class's storage levels.

A migration group is a free-text character string that is used to group documents with the same migration group string together when migration occurs, and the documents are written to the same media. Each storage class is preferably assigned a migration group level. This is a number that determines how migration groups are formed.

A grouping algorithm may be used in the storage processor to group any documents whose next storage level is the triggering (i.e., the selected) document's target partition, whose migration group level is less than or equal to the migration group level of the trigger document's current storage level, and whose migration group matches the migration group of the trigger document.

The process steps of the preferred embodiment of the algorithm may be described as follows:

1. The migration algorithm is launched, either because a user initiated it or because a storage server detected that too little free space is available in a storage partition.

2. The migration algorithm identifies the document to be moved from the partition by selecting the least recently accessed document in the partition.

3. The selected document (known as the trigger document) is moved from its current partition (known as the source partition) to a new partition (known as the target partition).

4. If the trigger document has no archive group string, then no grouping will occur for that document. The next least recently accessed document in the partition is selected for migration as described above.

5. If the trigger document has an archive group string, documents with that same archive group string and the same target partition are identified as part of the "intermediate" group.

6. For each document in the "intermediate" group, the archive group level associated with the appropriate storage level of each document's storage class is compared. Each document belongs to a storage class, each storage class has multiple storage levels, and each storage level has an archive group level defined. The definition of the storage level where the document exists prior to migration determines what grouping will occur. For example, when an instance of a document migrates from storage level 1 to storage level 2, the migration group level for storage level 1 determines how the document will be grouped when it moves to the new level.

7. If the trigger document's archive group level is zero, then no group will be formed and the next least recently accessed document in the partition is selected for migration.

8. If the trigger document's archive group level is greater than zero, then for each document in the "intermediate" group, the document is part of the "final group" if the storage level of the document's storage class has an archive group level that is greater than or equal to the archive group level of the storage level of the trigger document's storage class.

9. Each document in the "final" group will be copied, not moved, to the same device as the trigger document. If the target device becomes full before the content of the entire group has been written, the remaining members of the group are written to another device with available free space.

10. These grouped documents are not removed from their current location. At some later time, when they are identified as a trigger document, the system will detect that they have already been migrated as part of a migration group and will simply remove the trigger instance from the appropriate storage device.

Figure 5:
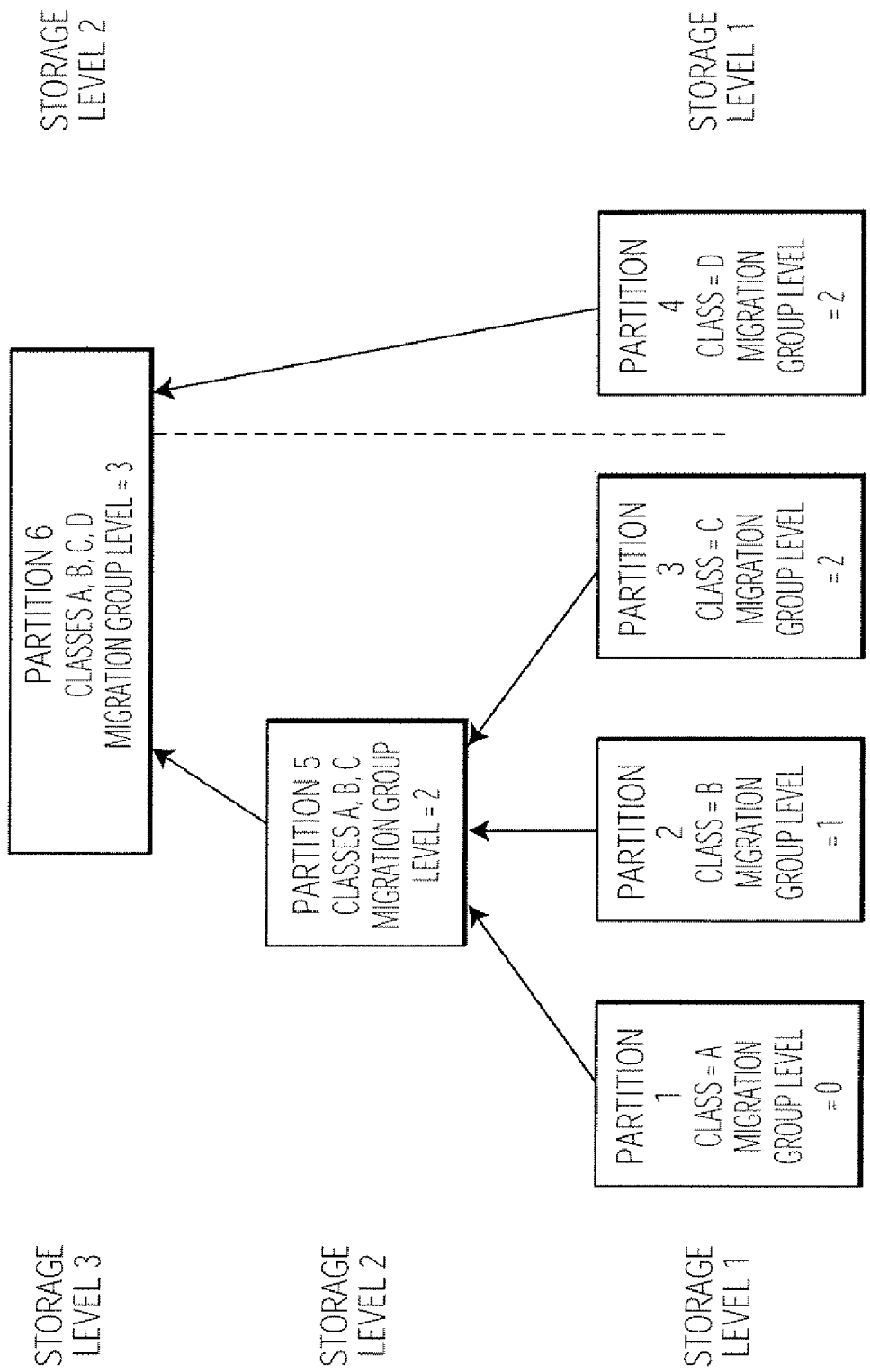
FIG. 5 is a diagram illustrating the migration of objects among a plurality of storage levels in accordance with aspects of the invention.

FIG. 5 is a diagram of an example of how a preferred embodiment of this migration algorithm of the storage processor may operate. As shown in FIG. 5, three storage levels are used in this example: Storage Level 1, Storage Level 2, and Storage Level 3. Six partitions are used, and are related as shown. There are four Storage Classes: A–D. FIG. 5 depicts a fairly simple example of how migration groups work. The four Storage Classes are defined at Storage Level 1. Documents eventually migrate to Partition 6. The documents in Storage Classes A, B, and C pass through Partition 5 before reaching their final destination.

When migration from Partition 1 occurs, documents will migrate individually. No migration groups will be formed because the migration group level for Storage Class A, Storage Level 1 is 0 (i.e. grouping is turned off). The migration level for documents in Storage Class B, Storage Level 1 is 1. When documents in Storage Class B migrate from Storage Level 1, documents in any class with the same target partition and with a migration level less than or equal to 1 will be grouped together. In this case, documents in Storage Classes A and B will be grouped together on Storage Level 2.

The migration level for documents in Storage Class C, Storage Level 1 is 2. When documents in Storage Class C migrate from Storage Level 1, documents in any class with the same target partition and with a migration level less than or equal to 2 will be grouped together. In this case, documents in Storage Classes A, B and C will be grouped together on Storage Level 2.

The migration level for documents in Storage Class D, Storage Level 1 is 2. When documents in Storage Class D migrate from Storage Level 1, documents in any class with the same target partition (Partition 6) and with a migration level less than or equal to 2 will be grouped together. In this case, documents in Storage Classes A, B and C in Partition 5 will be grouped together in Partition 6.

As noted above, the storage processor is also programmed to automatically provide and manage read-only alternate copies of documents to satisfy a user's retrieval request. While some storage products in the prior art provide redundant copies, they typically do not provide the possibility of as many alternate copies as in the storage processor, nor are these prior art systems typically programmed to intelligently select the order in which alternate copies are accessed.

At the time a document is acquired, the storage processor may simultaneously write up to seven copies of a document. Typically one alternate copy, called the journal copy, is created at the time a document is initially created. This alternate copy immediately protects the document from any single hardware failure. If the journal copy is not created when the document is initially stored, it may also be created on demand at anytime. Alternate copies may also be created when data on a removable media device is temporarily copied to a magnetic disk (known as a retrieval partition) as a result of a user access. Additional alternate copies may be created as the storage processor automatically migrates a document up and down the document's storage level hierarchy.

If the primary copy of a document is inaccessible for any reason, the storage processor is programmed to automatically provide the user with a read-only alternate copy if one is available (preferably if the storage processor is configured to supply alternate copies of documents). Every attempt is made to find an alternate copy of the document that may be accessed without operator intervention.

Providing backup copies of documents increases system availability because it allows users to continue to access documents while the primary copy of a document is inaccessible. Alternate copies may be displayed, but no changes to these documents are permitted. Changes (like inserting new pages, or replacing existing pages) are allowed for documents whose primary device is accessible.

In operation, the alternate copy algorithm may operate as follows. If a calling application has requested to retrieve an object (e.g., a page of a document), the storage processor determines the device on which the document is located and whether or not the device is available. The device is unavailable if a flag in the database of database server (309) (FIG. 3) says that the storage processor may not read from the device, or if any error is encountered while trying to access the document stored on the device.

If the device is not available, the storage processor preferably makes a list of existing alternate copies. The list is created in a specific order to make sure the alternate copy on the fastest media with the least operational delay is chosen. A document instance is a document copy that is created to be processed. When ordering the list, the storage processor takes into account the document copy's instance type (primary or journal), whether the document instance is on permanent or removable media, and whether the media is available without operator intervention. The order in which alternate copies are accessed is preferably as set forth herein. A typical list order would be:

1. Primary magnetic disk (in a Primary Partition).
2. Primary copy in a Retrieval Partition (on magnetic disk).
3. Journal copy on magnetic disk.
4. Primary copy on direct-access removable media (like optical or DVD) in a media library.
5. Journal copy on direct-access removable media (like optical or DVD) in a media library.
6. Primary copy on sequential-access removable media (like magnetic tape) in a media library.
7. Journal copy on sequential-access removable media (like magnetic tape) in a media library.
8. Primary copy on direct-access removable media that requires an operator to load the media.
9. Journal copy on direct-access removable media that requires an operator to load the media.
10. Primary copy on sequential-access removable media that requires an operator to load the media.
11. Journal copy on sequential-access removable media that requires an operator to load the media.

As also noted above, if a modification to any document fails, the storage processor attempts to return the document to the state it was in just prior to the beginning of the failed transaction. The storage processor automatically repairs a document: 1) so users are not blocked from accessing it, 2) to reduce the time that documents are unavailable to users, and 3) to reduce the need for support personnel to manually repair the documents and make then accessible again.

Some of the changes to the documents are complicated and involve many steps to complete. To manage the complication and keep track of exactly what needs to be done to restore a document to the most recent stable state, checkpoints are preferably defined in the programming algorithm of the storage processor. The checkpoints indicate what the software has accomplished and what actions are in progress. If an operation fails, the checkpoint information, initially stored in server (416) process's memory, is written to the database. The storage processor is then programmed to attempt to restore the document to the most recent stable state. The repair algorithm uses the checkpoint information to determine what work needs to be performed. Because the checkpoint information is preferably stored in a non-volatile database in database server (309) (as opposed to volatile memory) once a failure has occurred, the checkpoint information can be used immediately or at some later time after the problem that caused the failure has been corrected.

A document can be in one of three types of states: stable, transitional, or error. A stable state is one in which the document can be accessed (i.e. a valid copy of the document exists and no changes are currently occurring to the document). A document is in a transitional state when it is being modified in some way, such as having new pages added, or being migrated to another storage level. A document is placed into an error state if any document modification operation fails. A document is available for access or modification when in a stable state. The purpose of the repair processing is to "undo" the modifications to a document that left it in a transitional or error state and return it to a stable state so it can once again be accessed or modified.

To support repair processing, the conventional document processing methods (such as Store, Insert, Replace, and Migrate) have been modified in the storage processor. For example, the document methods log initial repair information, set internal checkpoints, and log more detailed repair information if an operation fails. If an operation completes successfully, the checkpoints are cleared and the repair information is deleted. The checkpoints indicate how far an operation progressed before failing. Checkpoints are set in the code, and not logged to the database. Extra database calls occur if an operation fails. Also, if database access is interrupted, the repair information is written to a log file in XML format. When a repair method is invoked, the repair information logged to the database is used to determine what actions are necessary to "undo" the operation and roll the document back to a consistent (stable) state.

Two database tables are preferably included in database server (309) to support repair processing, such as DocsInTransition and DocStgInTransition tables, for example. The DocsInTransition table preferably contains information about the request and the state of the document before the operation began. This information is written to the database when the document state is changed to a transitional state. If the operation fails, this information is updated with the current checkpoint and state. The DocStgInTransition table preferably contains information about the storage instances. This information is dependent on the phase in which the operation failed. For example, if the operation failed in the "move to acquisition level" phase, the entries in the DocStgInTransition table indicate either the storage entries being written or the storage entries being deleted. The checkpoint would indicate exactly which of the two operations failed.

The programming modules for repairing the document files are preferably divided into three levels. The top level consists of the programming modules that are callable by a user, in this case through a maintenance interface on maintenance utility (313) or a testing subroutine. These include, for example:

Repair( )—Repair documents in the DocsInTransition table.
Repair(IkmDocId docId)—Repair a specific document.
Repair(StmStates state)—Repair documents in a specific state.

The top-level functions check the repair information for a document to determine what operation failed. The second level functions are invoked based on the failed operation. For example, if a Store operation failed, then a RepairStore() process would be invoked by the system. Within the second level functions, the actions necessary to undo the operation are called in the order specific to undo that operation. These functions call the third level functions to perform very specific tasks. An example of a third level function might be a function that deletes newly stored objects from a document while leaving the existing objects intact. These third level functions may also be called by the Verification functions.

The DocsInTransition table contains a column that indicates the number of times a repair operation has been attempted on a document. Before repairing a document, the repair functions check the repair attempts. If the repair attempts limit has been exceeded, the repair operation is not performed and the document is left in its original (transitional or error) state. The repair attempt limit may be pre-defined as a configuration setting.

Following are two pseudo code examples demonstrating checkpointing and the logging of repair information, and the basic flow of repair operations.

Pseudo code showing the basic flow of checkpointing and the logging of repair information:

```
void CStmDocument::StoreObjects( )
{
    // Refresh the document information. This ensures that the Document
    // object (CStmDocument) is in synch with the information in the
    // database.
    GetInfo( );
    // Set the checkpoint and state to indicate the operation being per-
    // formed. The SetState method updates the repair information based
    // on the type of the state being set. For example, if the new state is a
    // transitional state, repair information is logged to the database.
    m_repairInfo.m_currCheckpoint =
    CKPT_SET_TO_TRANSITIONAL_STATE;
    SetState (STM_STATE_STORE_OBJECT,
    DOCUMENT_NOT_MODIFIED);
    try
    {
        // Set the checkpoint and do some work . . .
        m_repairInfo.m_currCheckpoint = CKPT_SOME_WORK;
        DoSomeWork( );
        // Set another checkpoint and do some more work . . .
        m_repairInfo.m_currCheckpoint =
    CKPT_SOME_MORE_WORK;
        DoSomeMoreWork( );
        // Everything worked, so set the stable state.
        m_repairInfo.m_currCheckpoint =
    CKPT_SET_TO_STABLE_STATE;
        // If the SetState method succeeds, it cleans up the repair
        // information.
        SetState(StableState, DOCUMENT_MODIFIED);
    }
    catch(. . .)
    {
        // The SetState method updates the repair information with the
        // current checkpoint and state.
        SetState(STM_STATE_ERR_STORE_OBJECT,
        DOCUMENT_NOT_MODIFIED);
        throw;
    }
    return;
}
```

Pseudo code demonstrating the basic flow of repair operations may be as follows:

```
void CStmDocument::Repair( )
{
    // Get all the information for the document, including the repair information.
    GetInfo( );
    // If no repair information is available, throw an error.
    if (m_repairInfo.m_currCheckpoint == CKPT_NOT_SET)
        IKM_THROW(STM_ERR_NOREPAIRINFOAVAIL, m_docId);
    // Check to see if we've exceeded the repair attempts limit. If so, throw an error.
    unsigned long repairAttemptsLimit = CStmServerConfig::GetRepairAttemptsLimit( );
    if (m_repairInfo.m_repairAttempts >= repairAttemptsLimit)
        IKM_THROW(STM_ERR_REPAIRATTLIMEXC, m_docId;
    // Next check to see if the document is active, meaning that an operation
    // such as store, insert, replace or repair is already in progress.
    if (!DbSetActiveFlag( ))
        IKM_THROW(STM_ERR_OPERINPROG, m_docId);
    // Set the state to STM_STATE_REPAIR
    SetState(STM_STATE_REPAIR, DOCUMENT_NOT_MODIFIED, DO_NOT_LOG_REPAIR_INFO);
    try
    {
        // Select what repair routine to call based on the current state. For example,
        // if we failed storing an object, call the RepairStore routine.
        switch (m_repairInfo.m_currentState)
        {
        case STM_STATE_STORE_OBJECT:
        case STM_STATE_ERR_STORE_OBJECT:
            RepairStore( );
            break;
        case STM_STATE_ANOTHER_OPERATION:
            RepairAnotherOperation( );
            break;
        case . . . :
            .
            .
            .
        default:
            IKM_THROW(STM_ERR_NOTYETIMP);
            break;
        }
    }
    catch ( . . . )
    {
        // If we can't fix the document, set the document back to the
        // original state and clear the active flag.
        DbClearActiveFlag( );
        IKM_THROW(STM_ERR_ERRORREPAIRDOC, m_docId);
    }
    // If we get here, the repair was successful. Set the state for the lowest
    // archive level.
    SetState(GetStableState(m_stgInstanceList, ARCHIVE), DOCUMENT_NOT_MODIFIED);
    return;
}
// Repair documents that failed during a store object operation.
void CStmDocument::RepairStore( )
{
    try
    {
        // The checkpoints are in the opposite order that they occur when storing.
        switch (m_repairInfo.m_currCheckpoint)
        {
        case CKPT_SET_TO_STABLE_STATE:
            // Do repair work . . .
            break;
        case CKPT_UPDATE_OBJECT_INFO:
            // Do repair work . . .
            break;
            .
            .
            .
        case CKPT_COPY_FILE_TO_DESTS:
            // Delete newly added objects.
            RepairDeleteObjectsFromLevels(m_repairInfo.m_stgInstances);
            break;
```

```
            case . . . :
                .
                .
                .
            default:
                IKM_THROW(STM_ERR_NOTYETIMP);
                break;
            }
        }
        catch ( . . . )
        {
            // Just re-throw error.
            throw;
        }
        return;
    }
    void CStmDocument::RepairDeleteObjectsFromLevels(const CStmStgInstanceList
&stgInstances)
    {
        // Do work to repair document.
    }
```

In other words, the storage processor generates an operation log in non-volatile memory for maintaining a progress record of an initiated and incomplete document processing operation, the progress record indicating how far said incomplete document processing operation progressed prior to interruption by an error condition. Background processor (405) uses the operation log to identify and undo the incomplete document processing operation to return a document in a current state to a previous version prior to initiation of the incomplete document processing operation. Storage server (404) processes the log for clearing said progress record in response to successful completion of the incomplete document processing operation.

Background processor (405) may use the operation log to undo the incomplete document processing operation by undoing individual component operations of the incomplete processing operation in reverse order to the order they were initially applied to the document. The component operations may comprise, for example, one or more selected from the group consisting of (a) store, (b) replace, (c) insert, and (d) migrate operations.

Storage server (404) may also record a number of iterative repair attempts made by the background processor (405) so that the document may be returned to the previous version and terminate the repair attempts in response to a predetermination iteration threshold number.

Figure 6A:
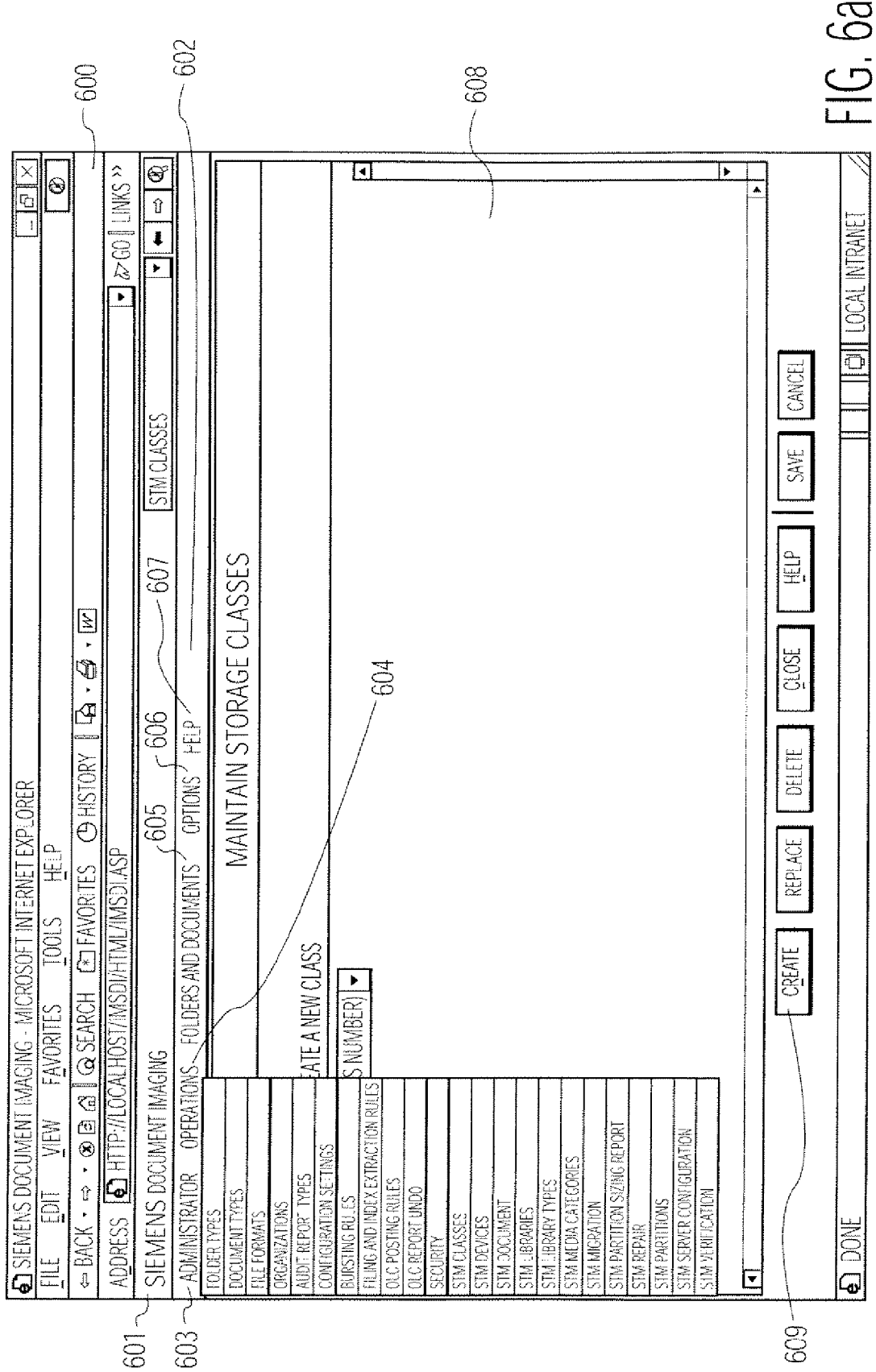
FIGS. 6(a)–(b) are computer screenshots illustrating a preferred embodiment of the management interface of the invention.

Management utility component (406) (FIG. 4) contains a set of interfaces that are programmed to allow administrators and support personnel to define, configure, and manage the present storage processor. An example of how these interfaces may be configured are described in more detail below for the storage classes aspect of the storage processor and in connection with FIGS. 6(a)–(b). FIG. 6(a), is a computer screenshot illustrating the user interface (600) to the document imaging system. As shown in FIG. 6(a), the user interface may operate as a plug-in viewer to an Internet Web browser (601), such as a MICROSOFT™ Internet Explorer (although not limited thereto). User interface (600) may include tool bar (602), having administrator menu (603), operations menu (604), folder and documents menu (605), options menu (606), and help menu (607).

Administrator menu (603) has been expanded to show available administrative options for the document imaging system. Menu items for the invention appear at the bottom of administrative menu (603) after "Security."

Figure 6B:
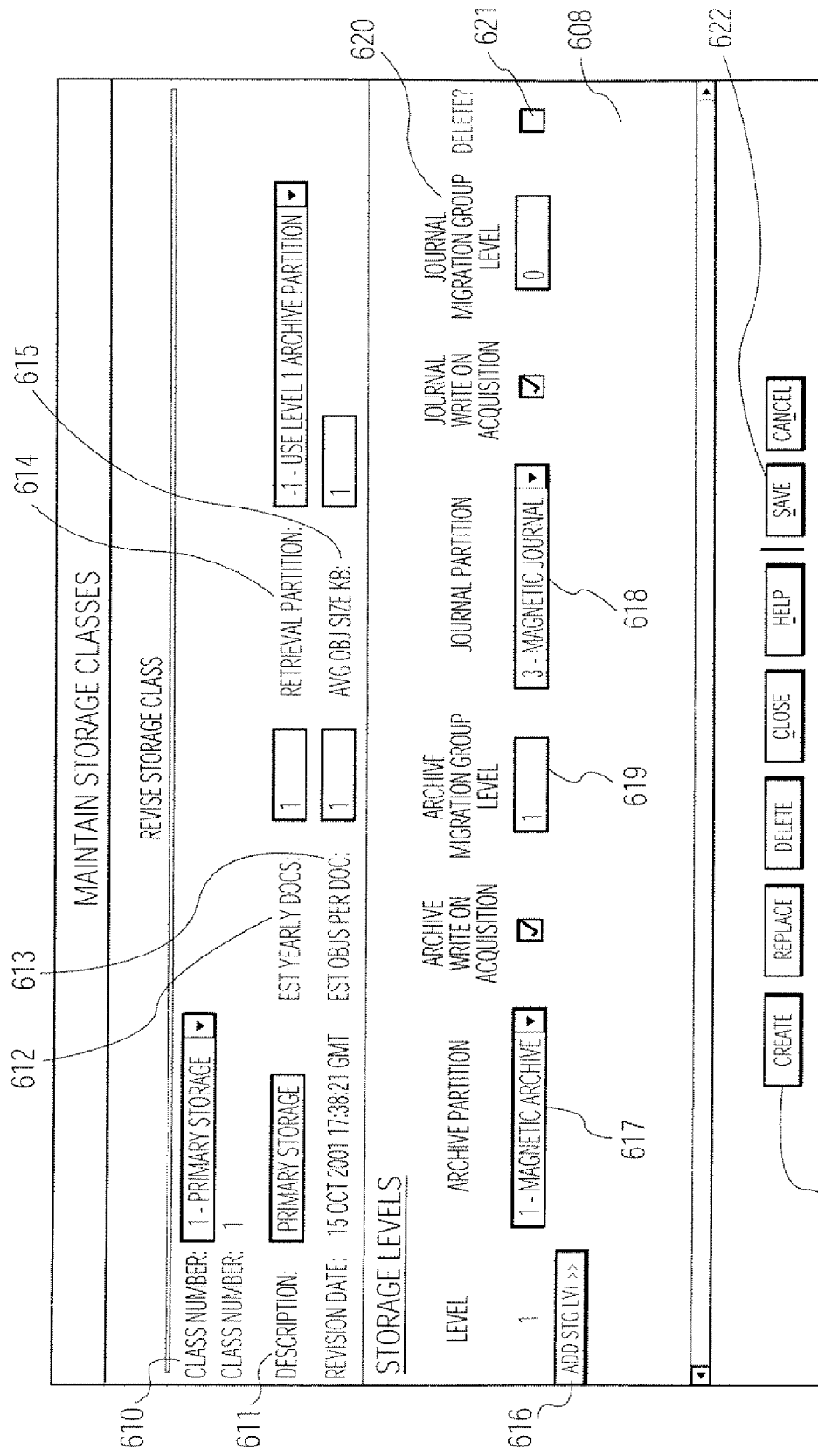

The STM Classes function enables the user to create the individual storage classes that document types will be assigned to. From administrator menu (603), the user selects "STM Classes." The "Maintain Storage Classes" window (608) then appears with the class number field visible, as shown in FIG. 6(b). From the Maintain Storage Classes window (608), click Create button (609). The additional fields shown in FIG. 6(b) will then appear on the screen. Enter information about this storage class as necessary.

Class number (610) is the number that will be assigned to this class. This is preferably automatically generated by the system in a conventional manner, unless the user has reasons for defining a class number scheme. To do so, enter 0 in this field. When the user saves the class information, the next available sequential number will automatically be assigned. Description (611) is the description of the storage class. The estimated yearly document (612) is the estimated number of documents that will be stored in this class on a yearly basis. The estimated objects per document (613) are the estimated number of files that a typical document stored in this class will contain.

At some point, the user may need to retrieve a document(s) from a non-magnetic, long-term storage device. Such documents are then stored temporarily in a short-term storage area called a retrieval partition. Retrieval partition (614) is a field that allows the user to specify the partition that will be used for retrievals. Average object size in KB (615) is an estimate of the size in kilobytes that a typical file (not a document, but the objects or files contained within) stored in this class will contain.

Next, the user will add storage levels. Storage levels refer to a device, but also the migration path of a storage class. For instance, a document enters the system and initially goes to storage level 1 (e.g., magnetic disk). After a predetermined period of time, it is migrated to storage level 2 (e.g., optical disk), if defined. After another predetermined period of time, it is migrated to storage level 3 (e.g., tape), if defined. The user may have any number of storage levels.

To configure the storage levels, the user will click Add Stg Lvl button (616). This will bring up the storage level fields. The user will then enter the following data. Archive partition (617), which refers to the storage media (e.g., magnetic disk, optical platter, etc.). An archive partition refers to primary storage. When the document-imaging system acquires a new document, typically it is stored to primary (archive) storage (e.g., a magnetic disk).

A journal partition stores duplicate copies of data objects to insure data in case of media failure. When journaling is turned on, any document that is saved to the archive partition is also saved to a journal partition. Journal partition (618) refers to the storage media (e.g., magnetic disk, optical platter, etc.). Journal partitions store duplicate copies of data objects to insure data in case of media failure. When journaling is turned on, any document that is saved to the archive partition is also saved to a journal partition.

For archive migration group (619), the user will enter 0 if, during migration, documents should not be grouped with other related documents. Otherwise, the user will enter a whole number to reflect the migration group level.

For journal migration group (620), the user will enter 0 if, during migration, documents should not be grouped with other related documents. Otherwise, the user will enter a whole number to reflect the migration group level. Typically, journal copies of documents are not grouped.

The above steps are repeated for each storage level the user wishes to add. If a user needs to delete a storage level from this storage class, then they would check the Delete? checkbox (621) to the right of the storage level (this does not delete any actual devices; rather it deletes the configuration for this storage level). When the user is finished, they click Save button (622).

A similar set of user interface windows may be used for configuring the other aspects of the storage processor.

Although this invention has been described with reference to particular embodiments, it will be appreciated that many variations will be resorted to without departing from the spirit and scope of this invention as set forth in the appended claims. For example, the terms "computer", "computer system", or "server" as used herein should be broadly construed to include any device capable of receiving, transmitting and/or using information including, without limitation, a processor, microprocessor or similar device, a personal computer, such as a laptop, palm PC, desktop, workstation, or word processor, a network server, a mainframe, an electronic wired or wireless device, such as for example, a telephone, an interactive television, such as for example, a television adapted to be connected to the Internet or an electronic device adapted for use with a television, a cellular telephone, a personal digital assistant, an electronic pager, a digital watch and the like. Further, a computer, computer system, or system of the invention may operate in communication with other systems over a communication network, such as, for example, the Internet, an intranet, or an extranet, or may operate as a stand-alone system.

What is claimed is:

1. In a storage system comprising a plurality of different storage partitions of different storage media hierarchically arranged into different storage levels and an individual partition includes a plurality of different data objects individually having attributes for indicating a target destination partition and for enabling determination of objects having similar data retention characteristics, a system for managing storage of an object comprising:
    a storage processor for determining a particular storage partition has reached a predetermined capacity threshold;
    a data migration processor for individually migrating objects in said particular storage partition by identifying within said particular storage partition individual first and second different objects to be moved in response to said capacity determination and by identifying different target destination partitions of said individual first and second different objects based on corresponding attributes of said first and second different objects, wherein said hierarchically arranged different storage levels correspond to different storage media types and at least one individual storage level includes a plurality of different partitions and said object attributes determine a particular target destination partition and storage level; and
    a transfer processor for transferring data representing said particular object to said target destination partition.

2. A system according to claim 1, wherein
    said data migration processor identifies within said particular storage partition an object to be moved based on frequency of access of said object relative to other objects in said storage partition, said object to be moved comprising an object with a lowest access frequency and
    said media type comprises at least one of, (a) magnetic disk, (b) optical disk, (c) magnetic tape and (d) semiconductor memory.

3. A system according to claim 1, wherein
    said object attributes include an identifier located external to an object indicating said object is to be grouped with other objects in response to information identifying related objects and
    said information identifying related objects comprises at least one of, (a) a patient medical record identifier, (b) a patient identifier and (c) a patient related information identifier.

4. A system according to claim 1,
    including a document generator for automatically creating a plurality of backup reproductions of a document for processing by said storage system.

5. A system according to claim 3, wherein said identifier located external to said object includes a migration group value in said storage partition for determining a grouping of objects to be migrated.

6. In a storage system comprising a plurality of different storage partitions of different storage media hierarchically arranged into different storage levels and an individual partition includes a plurality of different data objects individually having attributes for indicating a target destination partition and for enabling determination of objects having similar data retention characteristics, a method for managing storage of an object comprising the activities of:
    determining a particular storage partition has reached a predetermined capacity threshold;
    determining a frequency of access of objects on said particular storage partition;
    individually migrating objects in said particular storage partition by identifying within said particular storage partition individual first and second different objects to be moved in response to said capacity determination, and by identifying a frequency of access of an object relative to other objects in said particular storage partition and by identifying different target destination partitions of said individual first and second different objects based on corresponding attributes of said first and second different objects; and
    transferring data representing said particular object to said target destination partition.

7. In a storage system comprising a plurality of different storage partitions of different storage media hierarchically arranged into different storage levels and an individual partition includes a plurality of different data objects individually having attributes for indicating a target destination partition and for enabling determination of objects having similar data retention characteristics, a system for managing storage of an object comprising:

a storage processor for determining a particular storage partition has reached a predetermined capacity threshold;

a data migration processor for individually migrating objects in said particular storage partition by identifying within said particular storage partition individual first and second different objects to be moved in response to said capacity determination and by identifying different target destination partitions of said individual first and second objects and by identifying a frequency of access of said object relative to ether objects in said storage partition said object to be moved comprising an object with a lowest access frequency; and a transfer processor for transferring data representing said particular object to said target destination partition.

8. A system according to claim 7, wherein said hierarchically arranged different storage levels correspond to different storage media types and at least one individual storage level includes a plurality of different partitions and said object attributes determine a particular target destination partition and storage level.

* * * * *